(12) United States Patent
Poolsappasit et al.

(10) Patent No.: US 11,375,406 B2
(45) Date of Patent: Jun. 28, 2022

(54) RADIO FREQUENCY (RF) INFORMATION VISUALIZATION

(71) Applicant: Hewlett Packard Enterprise Development LP, Houston, TX (US)

(72) Inventors: Nayot Poolsappasit, Sunnyvale, CA (US); Haritha Tamvada, Sunnyvale, CA (US); Pengju Jin, Pittsburgh, PA (US); Sujatha Mandava, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 990 days.

(21) Appl. No.: 16/074,264

(22) PCT Filed: Mar. 4, 2016

(86) PCT No.: PCT/US2016/020868
§ 371 (c)(1),
(2) Date: Jul. 31, 2018

(87) PCT Pub. No.: WO2017/151145
PCT Pub. Date: Sep. 8, 2017

(65) Prior Publication Data
US 2021/0185564 A1    Jun. 17, 2021

(51) Int. Cl.
*H04W 28/18*       (2009.01)
*H04B 17/345*     (2015.01)
(Continued)

(52) U.S. Cl.
CPC ............ *H04W 28/18* (2013.01); *G06T 11/00* (2013.01); *G06T 13/80* (2013.01); *H04B 17/345* (2015.01);
(Continued)

(58) Field of Classification Search
CPC .. G07C 9/00119; H04W 4/008; H04W 12/08; H04W 12/04; H04L 63/0861; H04L 63/0492; G06K 9/2054
See application file for complete search history.

(56) References Cited

U.S. PATENT DOCUMENTS 6,008,808 A    12/1999   Almeida et al.
7,522,917 B1    4/2009    Purdy et al.
(Continued)

FOREIGN PATENT DOCUMENTS

CN       101029825 A    9/2007
CN       104581762 A    4/2015
(Continued)

OTHER PUBLICATIONS

European Search Report and Search Opinion Received for EP Application No. 16892891.9, dated Sep. 24, 2019, 8 pages.
(Continued)

*Primary Examiner* — Iqbal Zaidi
(74) *Attorney, Agent, or Firm* — Brooks, Cameron & Huebsch, PLLC

(57) ABSTRACT

An example device in accordance with an aspect of the present disclosure includes an overlay engine, storage engine, and visualization engine. The overlay engine is to generate a static overlay, the storage engine is to store a plurality of static overlays generated by the overlay engine, corresponding to a plurality of time periods. The visualization engine is to visualize dynamic characteristics of the RF information based on generating an animated visualization showing progression of the RF information over time to illustrate historical trending of the dynamic characteristics.

12 Claims, 8 Drawing Sheets

(51) Int. Cl.
*G06T 11/00* (2006.01)
*G06T 13/80* (2011.01)
*G06F 3/04847* (2022.01)

(52) U.S. Cl.
CPC ...... *G06F 3/04847* (2013.01); *G06T 2200/24* (2013.01)

(56) References Cited

U.S. PATENT DOCUMENTS

| | | | |
|---|---|---|---|
| 7,945,658 | B1 | 5/2011 | Nucci et al. |
| 2005/0043933 | A1 | 2/2005 | Rappaport et al. |
| 2007/0004394 | A1 | 1/2007 | Chu et al. |
| 2009/0037149 | A1 | 2/2009 | Vitek |
| 2010/0039433 | A1 | 2/2010 | McGreevy et al. |
| 2014/0036065 | A1 | 2/2014 | Oakley et al. |
| 2014/0055490 | A1 | 2/2014 | Mule et al. |
| 2014/0152869 | A1* | 6/2014 | Solotko .............. H04N 5/23206 348/231.3 |
| 2015/0103806 | A1 | 4/2015 | Kuusilinna et al. |
| 2015/0248785 | A1* | 9/2015 | Holmquist ............ G06T 19/006 345/419 |
| 2016/0014613 | A1 | 1/2016 | Ponnampalam et al. |
| 2017/0039765 | A1* | 2/2017 | Zhou .......................... G06T 7/55 |

FOREIGN PATENT DOCUMENTS

| | | |
|---|---|---|
| CN | 104838280 A | 8/2015 |
| CN | 104994514 A | 10/2015 |
| WO | WO-2014150192 | 9/2014 |
| WO | 2016/003862 A1 | 1/2016 |

OTHER PUBLICATIONS

International Searching Authority, The International Search Report and the Written Opinion, dated Nov. 29, 2016, PCT/US2016/020868, 12 Pgs.

Jasmine P.L. Araujo et al., "The Influence of Interferene Networks in QoS Parameters in a WLAN 802.11g Envonrontment," Jun. 22, 2007, pp. 1-14.

* cited by examiner

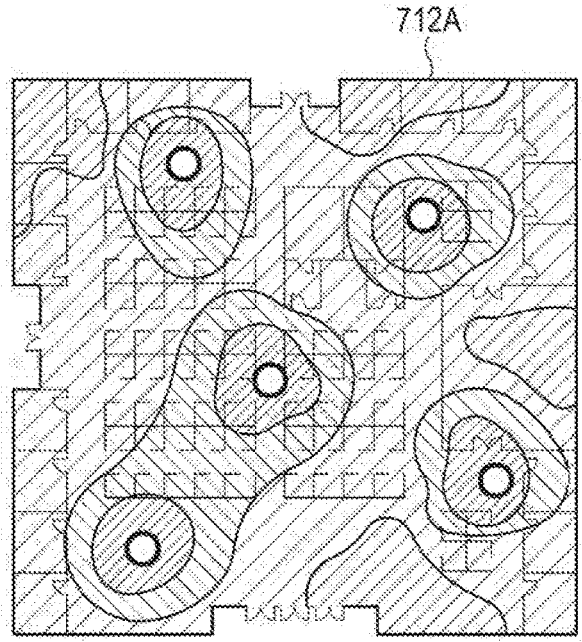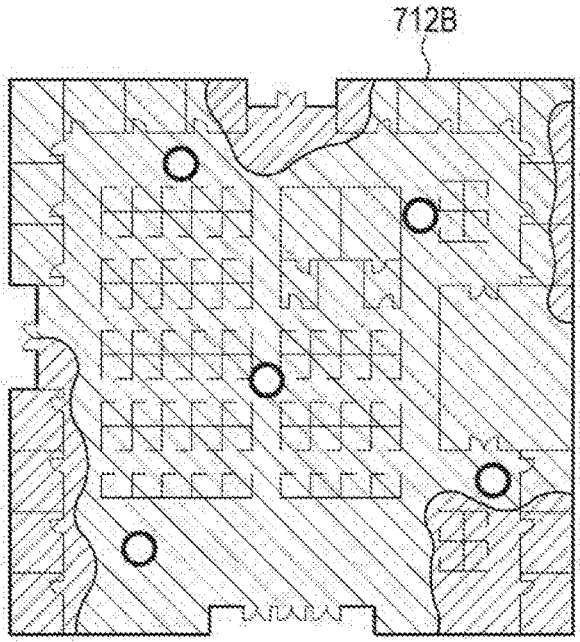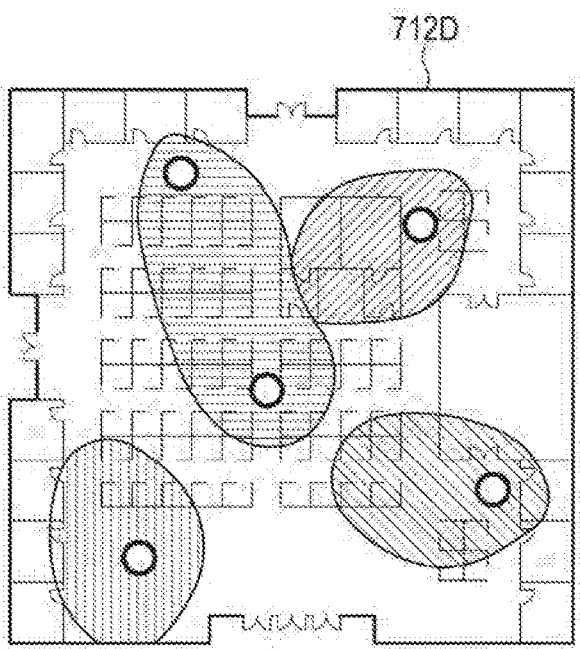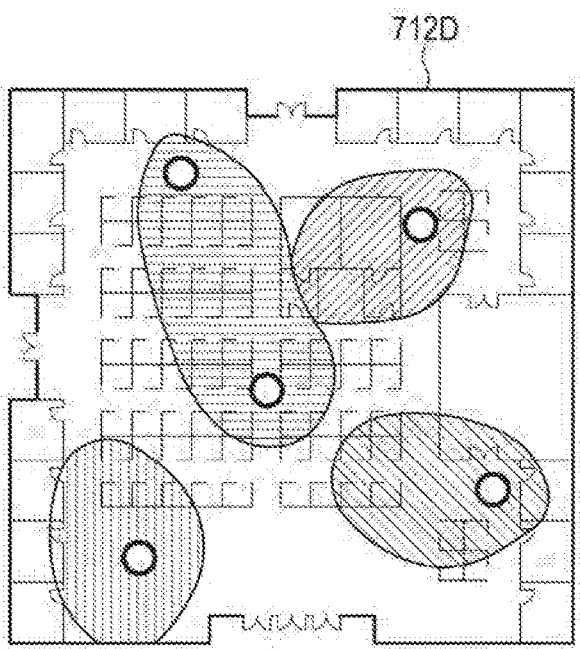
FIG. 7A Heatmap Overlay
FIG. 7B Speed Overlay
FIG. 7C Channel Utilization Overlay
FIG. 7D Channel Overlay Client Heath Overlay Voice Overlay UCC Overlay AppRF Overlay

RADIO FREQUENCY (RF) INFORMATION VISUALIZATION

BACKGROUND

Wireless networks can involve multiple tiers of wired network devices/apparatuses such as switches, routers, controllers, access point, stations, and the like that operate based on radio frequency (RF) information. When deployed into a service field, each individual network device can emit service signals over a given service region to provide wireless network service.

Wireless network service quality can be measured in many aspects such as speed, voice, signal strength, channel utilization, channel interference, and so on. Such metrics can be referred to generally as RF data. A projection of RF data onto a static two-dimensional space can be referred to as an RF overlay.

The quality of wireless service is influenced by static factors (e.g. floor height, signal obstacles, etc.) and dynamic factors (e.g. number of wireless clients, internet behavior, etc.). Dynamic environment patterns, such as client roaming or service routines, also can impact network quality of service.

BRIEF DESCRIPTION OF THE DRAWINGS/FIGURES

DETAILED DESCRIPTION

Wireless network quality of service can vary, due to factors such as influence from network clients consuming varying rates of data, roaming from one place to another, and otherwise introducing unpredictable influences into the wireless network. Wireless network service quality can also be degraded by factors such as the number of network clients, distance between clients and access points, transmission power of access points in the wireless network, channel interference, physical obstacles, etc. Such behaviors and factors can dynamically change the shape of wireless network service strength levels. As a result, it is not possible for any service provider to guarantee a stable service quality at a precise level at any given position and time of the wireless network. This explains why none of the leading Internet providers announce lower bound service quality level. In fact, minimum service level assurance is a very challenging problem.

To address such issues, example implementations described herein may provide historical RF data progression, to visualize the characteristics of wireless networks (such as quality of service), which characteristics broadly include speed, connectivity, throughput, and roaming instabilities. In this manner, examples described herein may provide data visualizations of real-time and historical wireless network RF data/information. Such visualizations can reveal the impact of dynamic factors on network quality of service, for use in analyzing dynamic aspects of wireless networks such as intermittent network connectivity issues. Visualizations also can be used at a macro level for network planning, quality of service (QoS) analysis, and trend analysis.

Figure 1:
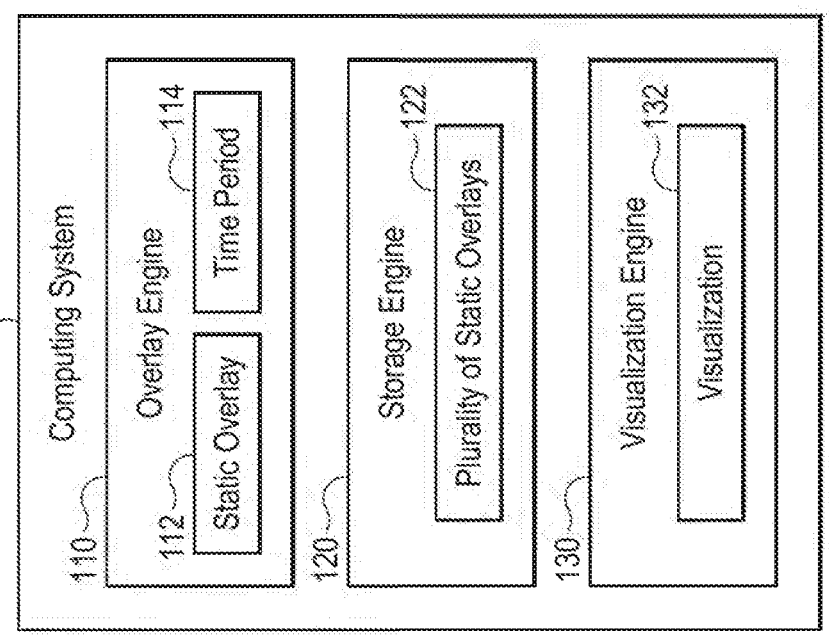
FIG. 1 is a block diagram of a computing system including a visualization engine according to an example.

FIG. 1 is a block diagram of a computing system 100 including a visualization engine 130 according to an example. The computing system 100 also includes an overlay engine 110 and a storage engine 120. The overlay engine 110 is associated with a static overlay 112 and a time period 114. The storage engine 120 is associated with a plurality of static overlays 122. The visualization engine 130 is associated with a visualization 132. The computing system 100 may, for example, be a server associated with network management software (or other network configuration/monitoring software) executing the functionality of the various engines described herein.

Network quality of service can be influenced by static factors and dynamic factors. Signal attenuation theories are well defined for static factors such as distance, height, office materials, obstacles, and the like. However, the influences of dynamic factors (e.g. roaming, channel interference, load-balancing, etc.) are not well defined, and the example implementations described herein enable the observation of transitions in network quality and other metrics, so as to realize and visualize the influence of dynamic factors on network service.

By correlating RF overlay data in a time-series dimension over time, example implementations enable visualization and analysis of historical RF data progression. For example, a series of static RF overlay snapshots can be plotted and visually animated over time. This ability to track changes of service quality over time can reveal transitional aspects of the service quality, which has previously been hidden (e.g., when a transient issue may not manifest at the particular time of a given analysis). Generating a time-series of service coverage quality changes over time enables, e.g., service quality coverage of network services to be analyzed. Accordingly, improved troubleshooting and understanding of dynamic behavior of network service quality can be realized.

The overlay engine 110 is to generate a static overlay 112, which can be generated as a contour map of radio frequency (RF) information of a wireless network for a given time period 114. Thus, the overlay engine 110 can routinely calculate RF overlay information per site, for an interval duration, to be stored (e.g., in an AirWave™ server of the wireless network) for historical trending. The overlay engine 110 is customizable to adjust a capturing interval of wireless provider's RF information to be used for generating a given overlay 112. Also, the overlay engine 110 is customizable to adjust a checking interval of wireless consumer's RF information to be used in generating a given overlay 112.

In some example implementations, the overlay engine 110 can operate periodically by using customizable values, such as how often to take a snapshot of a given characteristic. Such customizable values can have default settings, such as a default of every 10 minutes. Another customizable value is how often to obtain data from network devices. Such default values can be determined by the overlay engine 110, e.g., by using a system service to periodically check available storage space and server resource, which can be used to adjust default values (e.g., decrease the intervals between taking snapshots when storage is available, and increase the intervals when storage is becoming full).

The overlay engine 110 can automatically adjust such values as well. For example, the overlay engine 110 can automatically identify how frequently to capture RF information according to a category of the selected overlay 112 to be visualized. If the overlay category involves frequently changing characteristics, the overlay engine 110 can increase the frequency that RF information is captured (e.g., changing a default 30-minute interval to instead use a one-minute interval). The overlay engine 110 also can automatically identify how frequently to capture RF information according to a category of application environment of the wireless network. For example, if the environment involves low foot traffic or other movements of network client devices, the overlay engine 110 can decrease the frequency that RF information is captured. The overlay engine 110 can also account for the business characteristics associated with usage of the wireless network. For example, in a school campus application environment having a fixed class schedule and movement of students carrying network client devices, the overlay engine 110 can use a RF information capture interval of 30 minutes. In contrast, an airport application environment can involve more random movements of network clients, where the overlay engine 110 can correlate the airport application to the use of a much shorter interval (e.g., 5 minutes). The overlay engine 110 can be pre-customized to include a list of different business applications, and corresponding suggested intervals to be used in response to selection of a given application. Thus, the overlay engine 110 can be operated with a custom capturing interval 114, which is different for a school environment vs. an airport environment vs. a stadium environment. Such factors can create greatly varying dynamic characteristics for the wireless network, even if the different environments were to involve the same raw number of network clients/people and wireless access points. When roaming, human bodies can interfere with the RF environments, as well as introduce complexities due to roaming from one access point to the next more frequently.

The storage engine 120 is to store a plurality of static overlays 122 generated by the overlay engine 110, corresponding to a plurality of time periods 114. For example, the storage engine 120 can receive a given static overlay 112 from the overlay engine 110 after the time period 114, and store that static overlay 112 to accumulate a collection of static overlays 122 for historical trending purposes.

The visualization engine 130 is to visualize dynamic characteristics of the RE information based on generating an animated visualization 132 showing progression of the RE information over time to illustrate historical trending of the dynamic characteristics. For example the visualization 132 is to visually track changes over time of service quality of the wireless network, which can visually reveal an intermittent coverage hole that appears and disappears by the changes of service quality over time of the wireless network. Without, such historical trending information, the temporary coverage hole (or other intermittent network issue) could go unnoticed if the issue is not manifesting during the time of a given network test that lacks historical progression.

A network administrator can easily use the historical RF data progression of the visualization 132 for better planning for a new deployment of a network device. Generally, to estimate a number of network access points and their deployment, a network administrator would needs an assessment of the area of service. Although static physical factors such as environment attenuation impact, obstacle impact, and interference impact can be identified, network consuming behavior and other dynamic factors are more difficult to ascertain. The example implementations of historical RF data progression can provide data-mining methodologies to better understand network consumption patterns, even in view of the widely varying behaviors (e.g., airport terminals vs sports stadium vs. school campus etc.).

As described herein, the term "engine" may include electronic circuitry for implementing functionality consistent with disclosed examples. For example, engines 110, 120, and 130 and others represent combinations of hardware devices (e.g., processor and/or memory) and programming to implement the functionality consistent with disclosed implementations. In examples, the programming for the engines may be processor-executable instructions stored on a non-transitory machine-readable storage media, and the hardware for the engines may include a processing resource to execute those instructions. An example system (e.g., a computing device), such as computing system 100, may include and/or receive the tangible non-transitory computer-readable media storing the set of computer-readable instructions. As used herein, the processor/processing resource may include one or a plurality of processors, such as in a parallel processing system, to execute the processor-executable instructions. The memory can include memory addressable by the processor or execution of computer-readable instructions. The computer-readable media can include volatile and/or non-volatile memory such as a random access memory ("RAM"), magnetic memory such as a hard disk, floppy disk, and/or tape memory, a solid state drive ("SSD"), flash memory, phase change memory, and so on.

Figure 2:
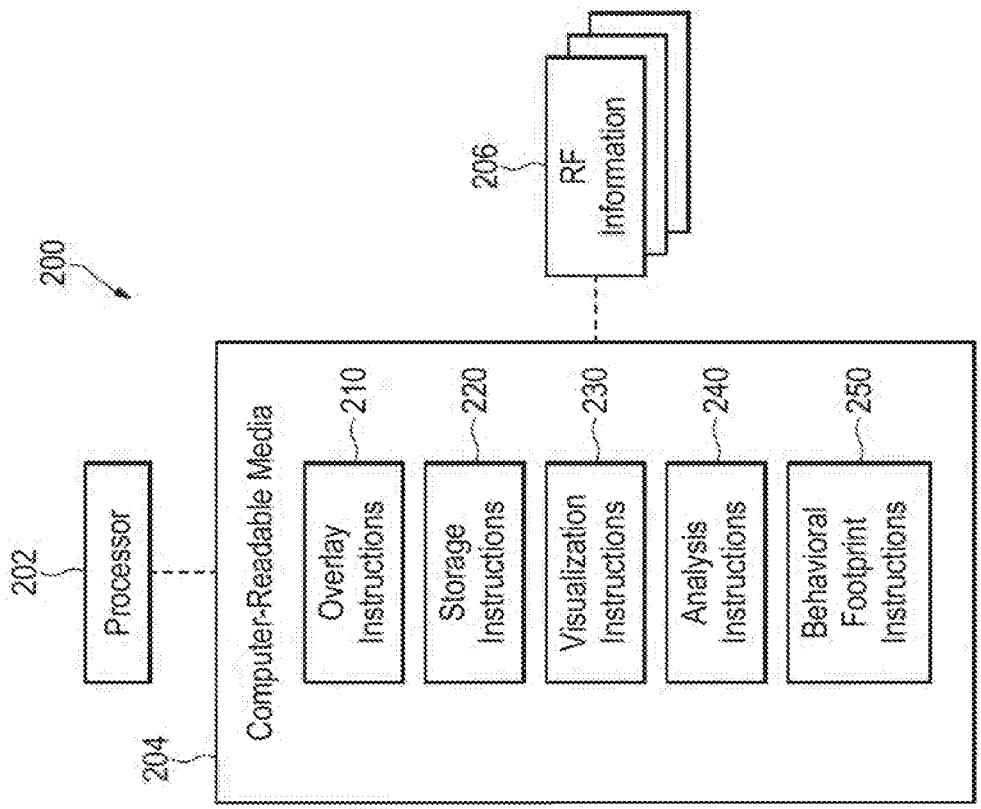
FIG. 2 is a block diagram of a computing system including visualization instructions according to an example.

FIG. 2 is a block diagram of a computing system 200 including visualization instructions 230 according to an example. The computing system 200 also includes processor 202, overlay instructions 210, storage instructions 220, analysis instructions 240, and behavioral footprint instructions 250 to interact with RF information 206.

In some examples, operations performed when instructions 210-250 are executed by processor 202 may correspond to the functionality of engines, such as engines 110-130 of FIG. 1 and other engines (not specifically shown in FIG. 1). Thus, in FIG. 2, the operations performed when overlay instructions 210 are executed by processor 202 may correspond to functionality of overlay engine 110 (FIG. 1). Similarly, the operations performed when storage instructions 220 and visualization instructions 230 are executed by processor 202 may correspond, respectively, to functionality of storage engine 120 and visualization engine 130 (FIG. 1). Operations performed when analysis instructions 240 and behavioral footprint instructions 250 are executed by processor 202 may correspond to functionality of an analysis engine and a behavioral footprint engine (not specifically shown in FIG. 1).

As set forth above with respect to FIG. 1, the various engines may include combinations of hardware and programming. Such components may be implemented in a number of fashions. For example, the programming may be processor-executable instructions stored on tangible non-transitory computer-readable media 204 and the hardware may include processor 202 for executing those instructions 210-250. Processor 202 may, for example, include one or multiple processors. Such multiple processors may be integrated in a single device or distributed across devices. Computer-Readable Media 204 may store program instructions, that when executed by processor 202, implement system 100 of FIG. 1. Media 204 may be integrated in the same device as processor 202, or it may be separate and accessible to that device and processor 202.

In some examples, program instructions can be part of an installation package that when installed can be executed by processor 202 to implement system 100. In this case, computer-readable media 204 may be a portable media such as a CD, DVD, flash drive, or a memory maintained by a server from which the installation package can be downloaded and installed. In another example, the program instructions may be part of an application or applications already installed. Here, media 204 can include integrated memory such as a hard drive, solid state drive, or the like. While in FIG. 2, media 204 includes instructions 210-250, one or more instructions may be located remotely from media 204. Conversely, although FIG. 2 illustrates RF information 206 located separate from media 204, the RF information 206 may be stored and included with media 204.

The computer-readable media 204 may provide volatile storage, e.g., random access memory for execution of instructions. The computer-readable media 204 also may provide non-volatile storage, e.g., hard disk or solid state disk for storage. Components of FIG. 2 may be stored in any type of computer-readable media, whether volatile or non-volatile. Content stored on media 204 may include images, text, executable files, scripts, or other content that may be used by examples as set forth below. For example, media 204 may contain configuration information or other information that may be used by engines 110-130 and/or instructions 210-250 to provide control or other information.

Figure 3:
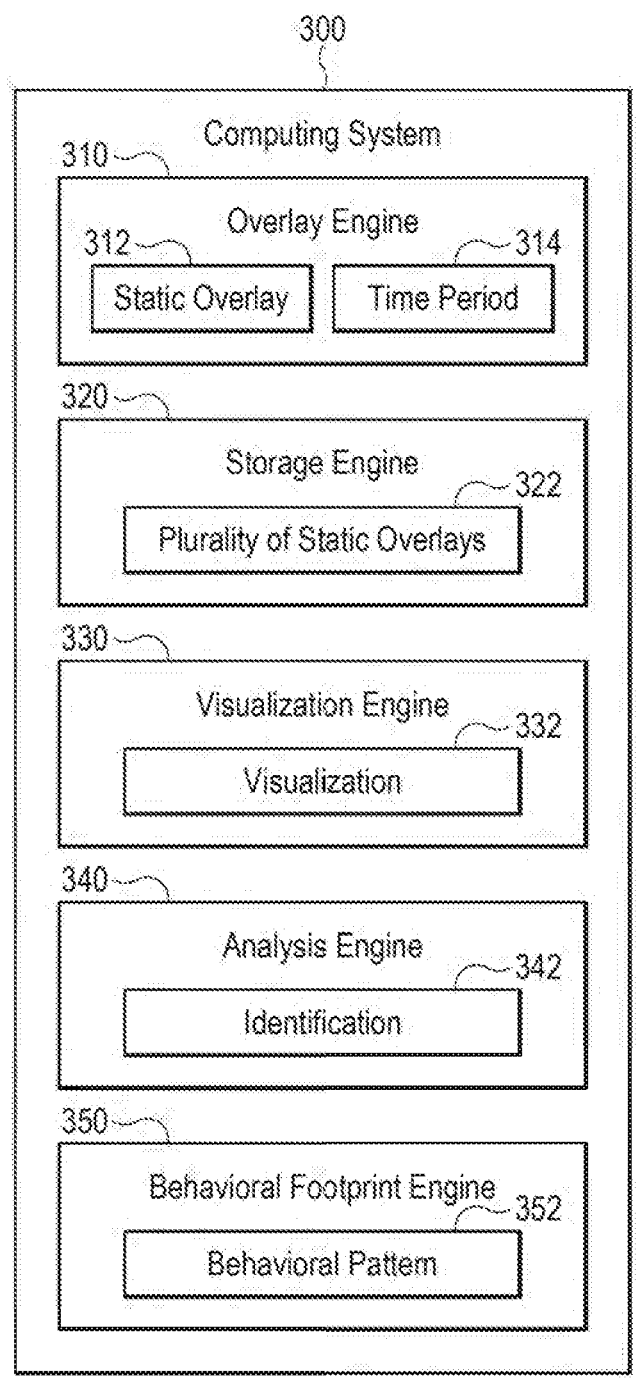
FIG. 3 is a block diagram of a computing system including a visualization engine according to an example.

FIG. 3 is a block diagram of a computing system 300 including a visualization engine 330 according to an example. As explained above regarding FIG. 1, the computing system 300 also includes an overlay engine 310 and a storage engine 320. The overlay engine 310 is associated with a static overlay 312 and a time period 314. The storage engine 320 is associated with a plurality of static overlays 322. The visualization engine 330 is associated with a visualization 332. The computing system 300 also includes an analysis engine 340, and a behavioral footprint engine 350. The analysis engine 340 includes identification 342, and the behavioral footprint engine 350 includes behavioral pattern 352.

The analysis engine 340 can apply an unsupervised learning approach, to automatically identify anomalies in the progression of the RF information over time. For example, the analysis engine 340 may apply data clustering, dimensional reduction, or other unsupervised machine learning techniques to perform pattern recognition on overlays and/or visualizations, to provide identification 342 of network anomalies associated with deviations or other notable events detectable by the machine learning. The data generated by a wireless network can be considered unsupervised data, on which clustering approaches may be used for categorizing the data and searching for patterns or clusters in the data. In some alternate example implementations, the analysis engine can be used to quantify service quality so as to compare different Radio Resource Management (RRM) schemes by monitoring progression of co-channel interference RF information over time according to the different RRM schemes. Such comparisons enable the analysis engine to identify which RRM scheme produces the least populated visualization, based on analyzing the overlays and producing a coverage score for a given overlay.

The behavioral footprint engine 350 can identify a behavioral pattern 352 based on the roaming footprint caused by clients in large numbers (e.g. change of classroom, boarding an airplane, etc.) over time as indicated by the visualization 332, and/or based on the transition of service coverage over time as indicated by the visualization 332. For example, the behavioral footprint engine 350 can identify roaming patterns of network clients and their impacts on service coverage provided by network access points to determine movement of service coverage over time. A similar approach can be used for identifying transition of service coverage over time due to the embedded instructions (e.g. device configurations, OS version, RRM, etc.).

Figure 4:
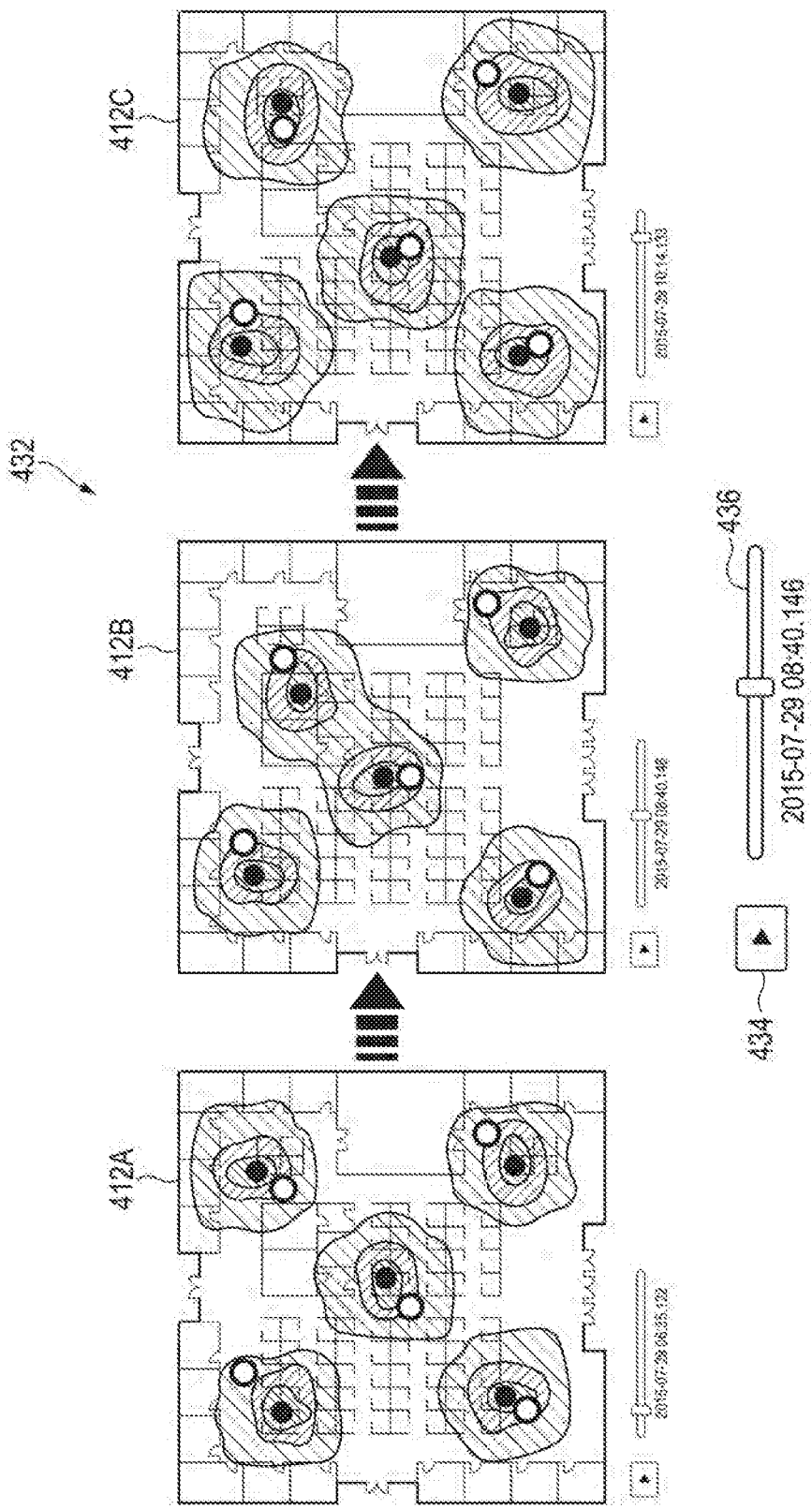
FIG. 4 is a diagram of a visualization including a play/pause interface according to an example.

FIG. 4 is a diagram of a visualization 432 including a play/pause interface 434 according to an example. The visualization 432 also includes a timeline slider 436 in the playback controls, to display an animation of the various static overlays 412A-C.

The visualization 432 can provide information on, e.g., a floor of interest in a building with a wireless network deployment. The playback interface is provided below the map. In response to selecting the play/pause enface 434, the visualization 432 can play back an animation of the RF overlays 412A-412C, visualizing the transformation of the RF overlays over a chosen interval indicated by the timeline slider 436. While playing the visualization 432 of the historical RF data progression, pause/resume is available, as well as seeking by moving the slider interface 436 to a given point in time.

The visualization 432 illustrates an example of heatmap historical playback. The heatmap overlay contour lines are rendered by the signal cutoffs (e.g., −75, −65, −55, −45 measured in decibels (dB)). Color codes help visualize the service quality, where red color represents a strong signal and no color represents poor spots where the service signal is weaker than, e.g., −95 dB.

Figure 5:
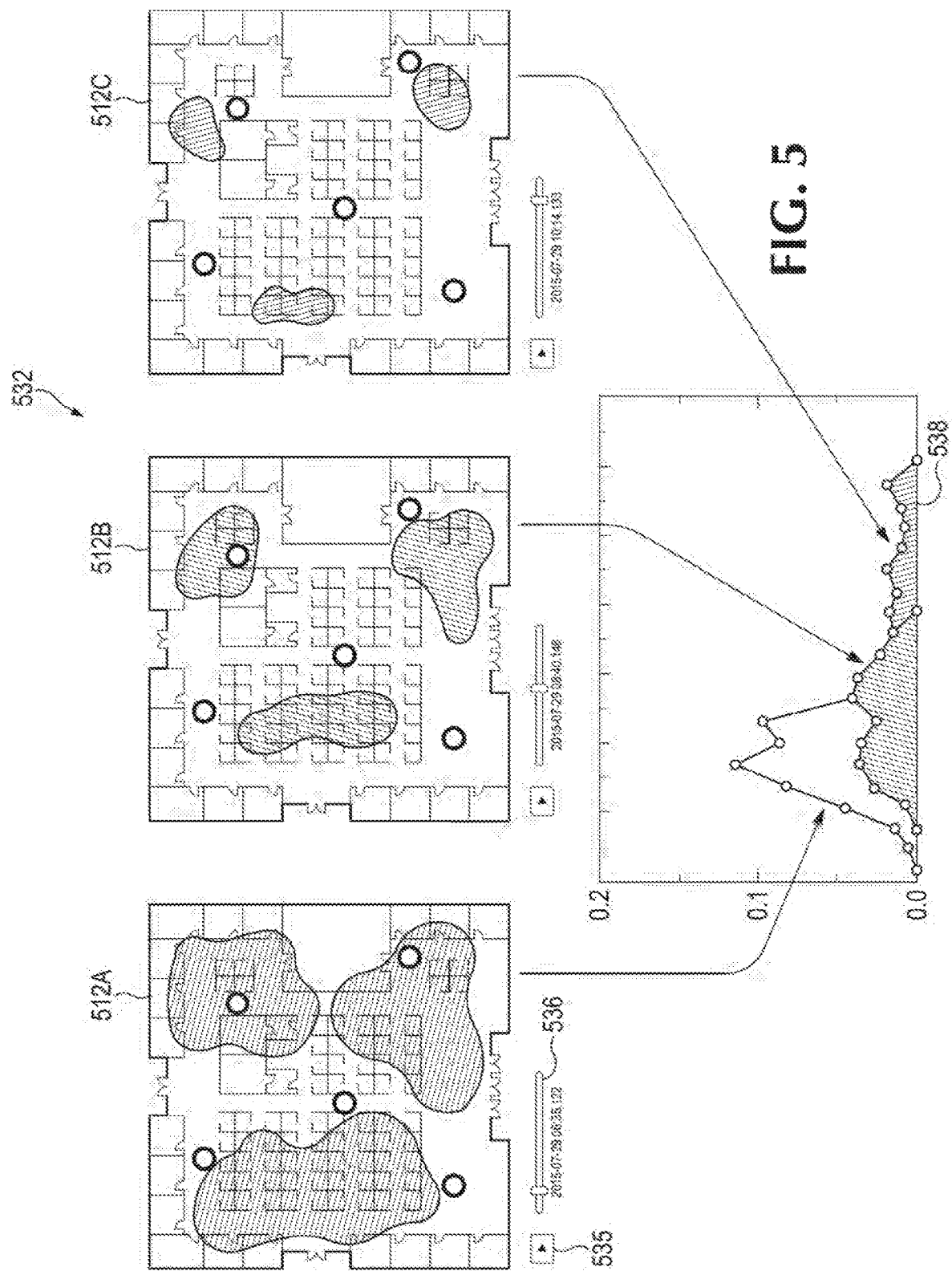
FIG. 5 is a diagram of a visualization including static overlays and a graph according to an example.

FIG. 5 is a diagram of a visualization 532 including static overlays 512A-C and a graph 538 according to an example. The visualization 532 also includes a record interface 535 and a timeline slider interface 536. The plurality of static overlays 512A-C represent snapshots in time of the various times throughout playback of the animation of the overlay visualization 532.

The record interface 535 enables interaction with various engines (e.g., storage engine) to record RF information for a given wireless network (e.g., a floor plan of a network installation as illustrated in FIG. 5). The interface can allow for specifying a number of hours to collect and record historical RF information for a given period of time. In alternate examples, the engines can record data for undetermined (e.g., indefinite) time periods, corresponding to available storage space. Example implementations can automatically adjust storage factors, such as capturing interval information (e.g., 1 second intervals) and number of data points (500 rooms of a network), based on available storage space. Such information can dynamically be adjusted during a recording session, as storage is used up.

An analysis engine (e.g., analysis engine 340 of FIG. 3) can be used to quantify visual coverage of a plurality of heat maps contained in the plurality of static overlays, such as overlays 5q2A-C. This information can be used by a visualization engine to the quantitative graph 538, where each point in the graph represents the amount of visual coverage for a given static overlay 512A-C corresponding to that point in time indicated by the slider 536 and/or x-axis coordinate on the graph 538.

The graph 538 can display a quantitative aspect of visual coverage against time for the overlays 512A-C. Such information can be used to compare results generated by different Radio Resource Management (RRM) schemes. For example, by monitoring progression of co-channel interference RF information over time according to the different RRM schemes, the graph 538 produced by the visualization engine thereby identifies which of the RRM schemes produced the least-populated visualization, e.g., based on achieving the lowest cumulative points along the y-axis, corresponding to the lowest area under the curve shown in the graph 538.

More specifically, FIG. 5 illustrates an example graph 538 and overlays 512A-C that can be used for quantifying co-channel interference for Radio Resource Management (RRM). Co-cannel interference is a challenge in a wireless network over a large area, where many adjacent Access Points may use the same channel frequencies. When adjacent Access Points use the same channel frequency, it causes conflict in that frequency, known as an "outage." The outage can degrade service quality over the overlapping area until one of the Access Point changes its frequency to avoid conflict. The problem is considered to be dynamic because it can be influenced by noises and other dynamic interferences on site, and because Access Point layout is subject to change (e.g. by adding/removing/replacing Access Points). Further contributing to the dynamic nature is that building materials are subject to change, and hence, affecting the service at various frequencies. Various different efficient dynamic RRM schemes can be used, such as certain Adaptive Radio Management protocols. The example approach shown in FIG. 5 can be used to compare different RRM approaches by monitoring a given approach over a period of time, and analyzing (e.g., by an example analysis engine) the amount of outage in overlay snapshots 512A-C over time. Such information enables collection of channel data RF information progression over time, to observe co-channel interference area against time using the graph 538. In some implementations, a preferred RRM approach would be one that minimizes its area under the plotted graph.

Other such graphs (e.g., corresponding to various other types of overlays/visualizations such as those shown in FIG. 7) can be provided, based on analyzing by an analysis engine to identify values for points to be plotted on the graph for comparing different types of RF data.

Figure 6:
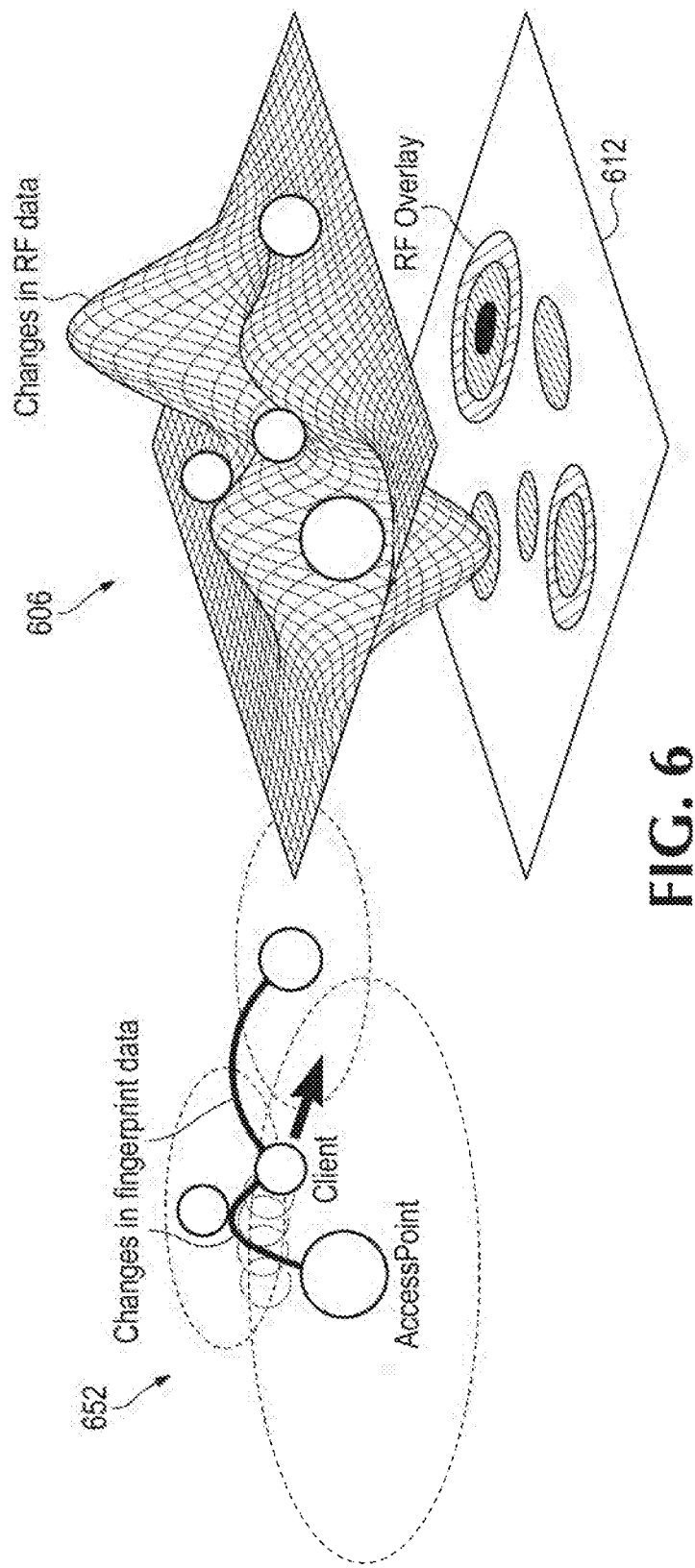
FIG. 6 is a diagram including RF information and a client's interaction when roaming from one Access Point to another according to an example.
Figure 7E:
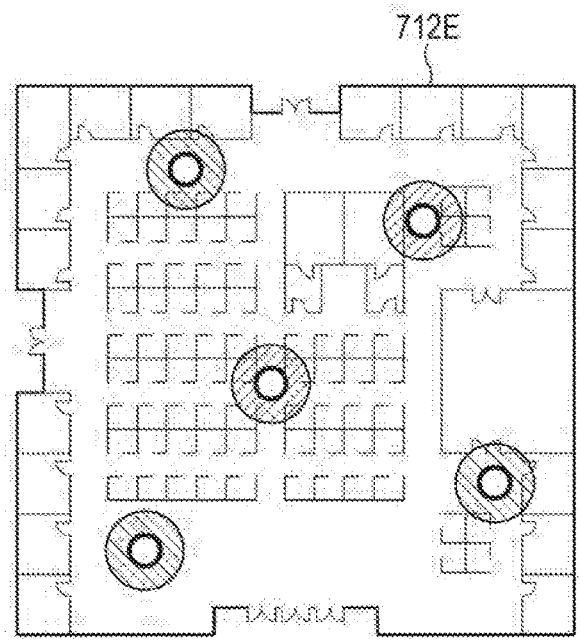
FIG. 7 is a diagram including RF information displayed in a plurality of static overlays according to an example.
Figure 7F:
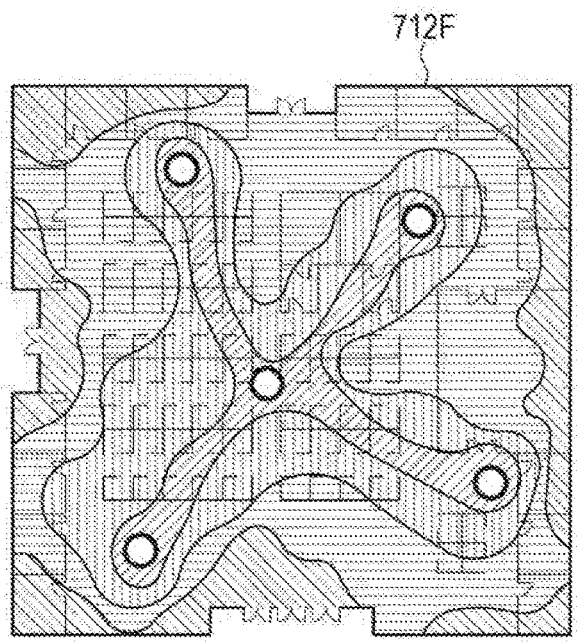
Figure 7G:
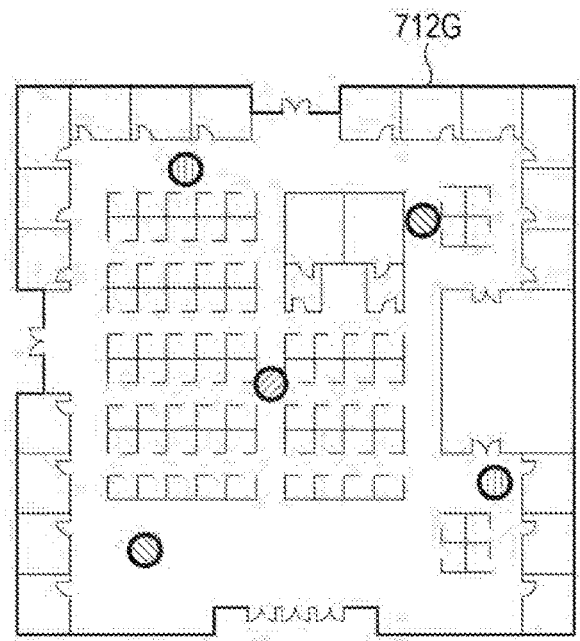
Figure 7H:
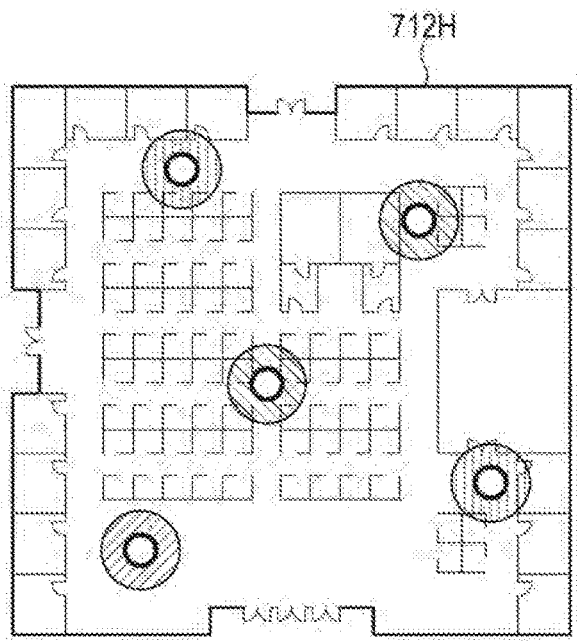

FIG. 6 is a diagram including RF information 606 and a behavioral pattern 652 according to an example. The RF information 606 can be mapped to a two-dimensional snapshot of the static overlay 612.

A given collection of network devices such as the access points illustrated in FIG. 6, can emit service signals, which together forms a wireless 'canvas' of RF information 606 covering a given service area. The service strength is strong around access points, and disperses with distance. Client network devices can consume the wireless network services, represented in the RF information 606 canvas as though the devices are 'placed' on top of the figurative canvas, and shown according to the more network services they consume, the deeper deflection they cause to the service canvas.

The wireless network quality of service is affected by the fact that network clients do not consume network services at a stable rate. Additionally, network clients often roam from one place to another. Such behavior dynamically changes the shape of the network service strength levels, analogous to movement of weighted spheres on the canvas. As a result, it is not possible for a service provider to maintain a precise level of service quality at any given position and time in the wireless network. Furthermore, service quality is also degraded by other factors such as the number of network clients, distance between network clients and access points, transmit power, channel interferences, physical obstacles, and the like.

Example implementations described herein can visualize RF data progression by identifying and storing changes in the quality of service canvas (or other RF information), as it is 'rippled' over time by the exchange of information of network devices in the network over time. Thus, the quality of the "entire ecosystem" of the network can be improved, in contrast to optimizing a given network device.

Example implementations to identify historical RF data progression can help troubleshoot networks and/or discover a "behavioral footprint" of the network. The "behavioral footprint" of the network quality can be identified as a pattern that is implied from clients roaming or transition of service coverage over time (e.g., see category of application environment as set forth above regarding FIG. 1 and behavior of a school campus vs an airport, for example). Example implementations described herein can correlate collected historical RF data progression with other mining data (e.g. flight schedules, class dismissal schedules, network firewall rules, etc.) to discover even more complex behavioral footprints, which are specific to an individual environment.

In an example application of such principles, the example implementations described herein can be used to detect a coverage hole issue. A customer environment may include an Access Point (AP) that is in a 'reboot loop.' The AP(s) that has/have gone down can create a coverage hole, but the reboot loop can be intermittent to close the coverage hole at some times and open the coverage hole at other times. The coverage hole could therefore be missed if performing network diagnostics when the coverage happens to be fine after the AP has rebooted. However, example implementations described herein enable the visualization of historical network coverage going up and coming down over time, resulting in the detection of the intermittent network coverage hole.

Such intermittent coverage hole examples can be further augmented by correlating the network RF information with other information not specifically generated by the network, such as school campus client traffic paths and external class attendance schedule information, to identify additional site behavioral patterns over time. Thus, the coverage history might show a coverage hole between 8:00 am and 9:00 am on Mondays, Wednesdays, and Fridays, corresponding to a behavioral pattern of users carrying network clients during attendance of a classroom within the range of the wireless network. This enables additional solutions to the network coverage hole, such as overlapping the class schedule to minimize the number of network clients consuming the network resources, or installing a network device to augment capacity (or increase power for existing network devices covering the classroom) during that time period to cover the network coverage hole.

The type of data collected by the examples described herein can be considered as unsupervised data in the context of machine learning. Because the data is unsupervised (e.g., not associated with a specific metric to identify where a given data point in isolation is desired or undesired), and because of the nature of unsupervised data (a large data flow far beyond a single or small group of data points), machine learning (such as data clustering approaches) can be used to identify issues such as network coverage holes and/or behavioral patterns. Such behavioral patterns can include very unrelated causes that a network engineer cannot identify from audit logs or other in-network data sources, such as landscape crews removing network APs before performing high-pressure window cleaning. Such causes of network issues can be identified by using the example approaches described herein to correlate network performance changes over time with external behavior/schedules, to troubleshoot behavioral incidents that affect network coverage. For example, a behavioral footprint engine can identify a behavioral pattern based on, e.g., roaming patterns over time as indicated by a visualization from a visualization engine, and/or based on transition of service coverage over time as indicated by the visualization. Thus, example computing systems can identify, through the behavioral footprint engine, the behavioral pattern by correlating the progression of the RF information over time to data sources that are not generated by the wireless network (e.g., classroom schedules, airplane departure times, etc.).

FIG. 7 is a diagram including RF information displayed in a plurality of static overlays 712A-H according to an example. The RF Overlay is shown as a 2D graphical representation of the coverage quality over a service field by a group/network of wireless Access Points at a given time. In alternate examples, an overlay may be represented as a 3D graphical representation. To generate a given RF information overlay 712A-H, an overlay engine can divide the service area into a grid of cells, and compute, corresponding information for a cell. As an example, for the heatmap overlay 712A, the overlay engine can identify network service strength attenuation influence by individual Access Points toward an individual grid cell. Given a collection of cutoff values (e.g. in dB, Mbps, etc.), a visualization engine can generate a collection of contour lines over a service area to create the overlay 712A. Overlays also can be enumerated by using aggregate metrics of network clients (such as packet loss, bytes transferred, data rate, etc.) collected from client connections. Various techniques may be used to collect information, and information over time can be stored by a storage engine for developing the visualization over time.

The visualization engine can animate RF overlay metrics, such as those of overlays 712A-H, over time emphasize the influence of dynamic environments and usage behavior toward the quality of wireless service. Thus, animated visualizations can capture transition patterns that may not otherwise be visible at a given time, or that may not show up in a static chart or tables or log files. Such visualizations provide easily understood information, and do not need an experienced administrator to manually attempt to correlate historical RF data from complex audit logs to manually attempt to find any RF anomalies. As illustrated in FIG. 7, slices in time of an animated visualization is shown, although each overlay would be visualized as an animated overlay that shows changes over time and can be played back based on play/pause and timeline slider interfaces (e.g., see visualization 432 of FIG. 4).

Generally, the heatmap overlay 712A can visualize the signal strength coverage quality of the wireless network service. The closer the client device is to the access point, the better signal quality it can receive. The speed overlay 712B can visualize the data transmission quality (e.g. Mbps) of the wireless network service. The channel utilization overlay 712C can visualize usage of the airtime and show airtime usage rate coverage, indicating how saturated the network is at a given time, and hence, how to avoid over utilization. The channel overlay 712D can visualize channel interference and shows a radio channel conflict map. Channel interference happens when multiple access points emit a signal at close frequency ranges. This results in signal congestion and/or cancellation which renders a poor service in the area in which the signals are congested. Channel overlay measures the area in which the signals are congested, and hence the bigger the overlay area, the poorer the service quality.

The client health overlay 712E can visualize the ratio of client airtime against ideal airtime that an access point should take to push client data. A client health of 50% means an access point takes twice as much time as it should take to push client data (e.g. retransmitting client data to the destination). The voice overlay 712F can visualize the number of service radios covering the area. The number of service radios increases in the area in which multiple access points are within the range of service. A higher number of service radios are often indicative of good service. However, poor channel design can cause channel interference in the high number radio area (see channel overlay). The UCC overlay 712G can visualize unified communications and collaboration (UCC) traffic, and the AppRF overlay 712H can visualize data usage and application in use via application radio frequency traffic. The UCC overlay 712G and the AppRF overlay 712H can be used to track application and UCC performance for troubleshooting, planning, and asset tracking.

Such example visualizations can be rendered by a visualization engine, including rendering a plurality of different types of visualizations overlapping. Such overlapping visualizations can characterize relationships between different types of RF information, such as corresponding to the types of overlays 712A-H. In addition, overlays from client devices can be overlaid and/or combined with overlays from access point or other non-client network devices to support complex network analysis. For example, analyzing AppRF overlay 712H overlapped with channel utilization overlay 712C to observe the impact of a new firewall configuration. Overlapping channel overlay 712D and client health overlay 712E can be used for performing co-channel interference analysis.

Figure 8:
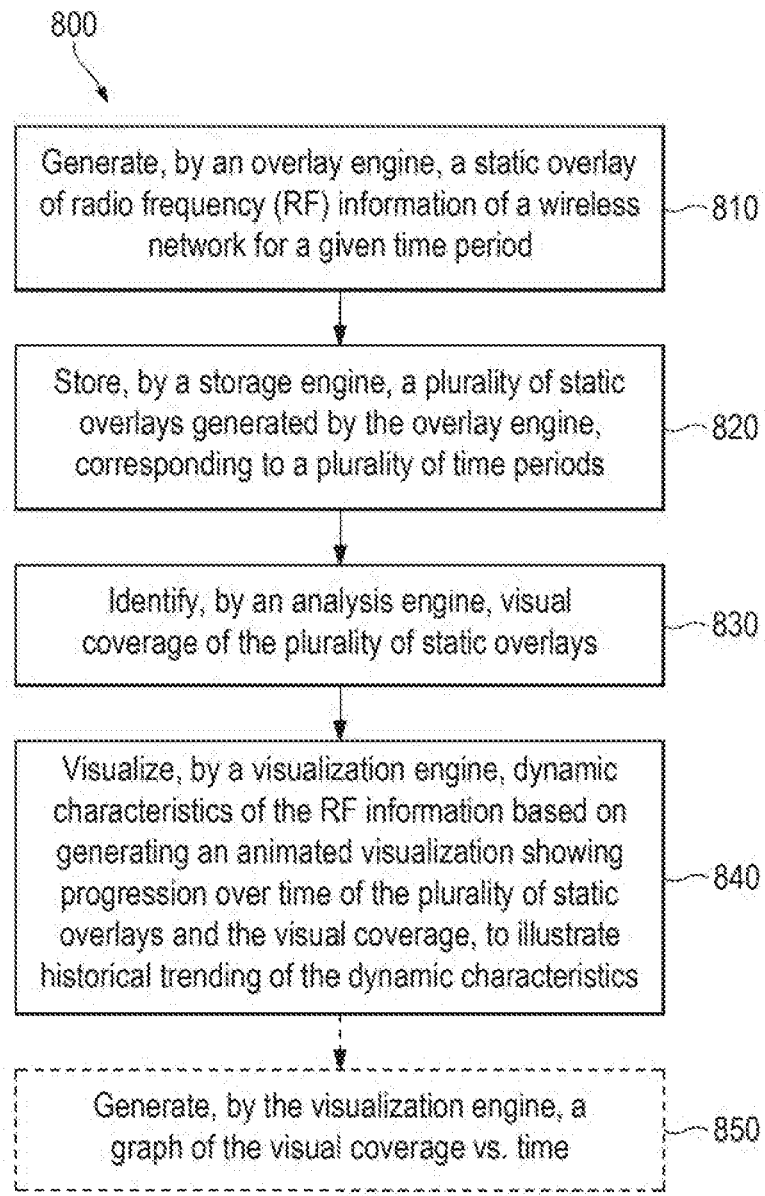
FIG. 8 is a flow chart based on visualizing dynamic characteristics of RF information according to an example.

Referring to FIG. 8, a floe diagram is illustrated in accordance with various examples of the present disclosure. The flow diagram represents processes that may be utilized in conjunction with various systems and devices as discussed with reference to the preceding figures. While illustrated in a particular order with particular processes, the disclosure is not intended to be so limited. Rather, it is expressly contemplated that various processes may occur in different orders and/or simultaneously with other processes than those illustrated, and some processes may be omitted (e.g., block 850 as shown in dashed lines).

FIG. 8 is a flow chart 800 based on visualizing dynamic characteristics of RF information according to an example. In block 810, an overlay engine is to generate a static overlay as a heat map of radio frequency (RF) information of a wireless network for a given time period. For example, the overlay engine can generate a channel utilization overlay as a snapshot in time for a given time period. In block 820, a storage engine is to store a plurality of static overlays generated by the overlay engine, corresponding to a plurality of time periods. For example, the storage engine can collect multiple static channel utilization overlays over the passage of time, to build a historical collection of how the overlays change over time. In block 830, an analysis engine is to quantify visual coverage of a plurality of heat maps contained in the plurality of static overlays. For example, the analysis engine can assign a value for how fully covered a given one of the overlays is, e.g., corresponding to a position on a graph such as graph 538 of FIG. 5, where higher coverage corresponds to a higher position on the y-axis, up to a coverage value of 1.0 corresponding to 100% visual coverage of the overlay. In block 840, a visualization engine is to visualize dynamic characteristics of the RF information based on generating an animated visualization showing progression over time of the plurality of static overlays and the visual coverage, to illustrate historical trending of the dynamic characteristics. For example, the visualization engine can generate an animation of the progression of overlay snapshots over time, coordinating the playback through the snapshots according to a timeline slider and play/pause interfaces. In block 850, the visualization engine can generate a graph of the visual coverage against time. For example, coverage information obtained by the analysis engine can be visualized by the visualization engine as a graph, such as graph 538 of FIG. 5. Such a graph can be used to visually identify which of a plurality of situations provides the most or least coverage, based on area under a given curve of the graph.

Examples provided herein may be implemented in hardware, software, or a combination of both. Example systems can include a processor and memory resources for executing instructions stored in a tangible non-transitory medium (e.g., volatile memory, non-volatile memory, and/or computer readable media). Non-transitory computer-readable medium can be tangible and have computer-readable instructions stored thereon that are executable by a processor to implement examples according to the present disclosure.

An example system (e.g., including a controller and/or processor of a computing device) can include and/or receive a tangible non-transitory computer-readable medium storing a set of computer-readable instructions (e.g., software, firmware, etc.) to execute the methods described above and below in the claims. For example, a system can execute instructions to direct a visualization engine to visualize dynamic characteristics of RF information, wherein the engine(s) include any combination of hardware and/or software to execute the instructions described herein. As used herein, the processor can include one or a plurality of processors such as in a parallel processing system. The memory can include memory addressable by the processor for execution of computer readable instructions. The computer readable medium can include volatile and/or non-volatile memory such as a random access memory ("RAM"), magnetic memory such as a hard disk, floppy disk, and/or tape memory, a solid state drive ("SSD"), flash memory, phase change memory, and so on.

What is claimed is:

1. A computing system comprising:
   an overlay engine to generate a static overlay of radio frequency (RF) information of a wireless network for a given time period;
   a storage engine to store a plurality of static overlays generated by the overlay engine, corresponding to a plurality of time periods; and
   a visualization engine to visualize dynamic characteristics of the RF information based on generating an animated visualization showing progression of the RF information over time to illustrate historical trending of the dynamic characteristics of the wireless quality of service, wherein the visualization is to visually track changes over time of service quality of the wireless network, and wherein the visualization is to visually reveal an intermittent coverage hole that appears and disappears by the changes of service quality over time of the wireless network.

2. The computing system of claim 1, wherein the visualization includes playback control including a play/pause button and a timeline slider.

3. The computing system of claim 1, wherein the overlay engine is customizable to adjust how often to capture wireless provider's RF information to generate a given overlay.

4. The computing system of claim 1, wherein the overlay engine is customizable to adjust how often to check wireless consumer's for updated RF information to generate a given overlay.

5. The computing system of claim 1, wherein the overlay engine is to automatically identify how often to capture RF information according to a category of selected overlay.

6. The computing system of claim 1, wherein the overlay engine is to automatically identify how often to capture RF information according to a category of application environment of the wireless network.

7. The computing system of claim 1, wherein the visualization engine is to render a plurality of different types of visualizations overlapping, to characterize relationships between different types of RF information.

8. The computing system of claim 1, further comprising an analysis engine to apply unsupervised machine learning approaches for unsupervised data to automatically identify anomalies in the progression of the RF information over time.

9. The computing system of claim 1, further comprising an analysis engine to compare different Radio Resource Management (RRM) schemes by monitoring progression of co-channel interference RF information over time according to the different RRM schemes, and to identify which RRM scheme produces the least populated visualization.

10. A method, comprising:
    generating, by an overlay engine, a static overlay of radio frequency (RF) information of a wireless network for a given time period;
    storing, by a storage engine, a plurality of static overlays generated by the overlay engine, corresponding to a plurality of time periods;
    identifying, by an analysis engine, visual coverage of the plurality of static overlays; and
    visualizing, by a visualization engine, dynamic characteristics of the RF information based on generating an animated visualization showing progression over time of the plurality of static overlays and the visual coverage, to illustrate historical trending of the dynamic characteristics, wherein the visualization is to visually track changes over time of service quality of the wireless network, and wherein the visualization is to visually reveal an intermittent coverage hole that appears and disappears by the changes of service quality over time of the wireless network.

11. The method of claim 10, further comprising generating, by the visualization engine, a graph of the visual coverage vs. time.

12. A non-transitory computer-readable storage medium encoded with instructions which, when executed by a computing system, cause the computing system to:
    generate a static overlay of radio frequency (RF) information of a wireless network for a given time period;
    store a plurality of static overlays corresponding to a plurality of time periods;
    visualize dynamic characteristics of the RF information based on generating an animated visualization showing progression over time of the plurality of static overlays to illustrate historical trending of the dynamic characteristics;
    identify a behavioral pattern based on at least one of i) movement of service coverage over time as indicated by the visualization, and ii) transition of service coverage over time as indicated by the visualization; and identify the behavioral pattern by correlating the progression of the RF information over time to data sources that are not generated by the wireless network.

* * * * *